(12) United States Patent
Tateishi

(10) Patent No.: US 6,376,947 B1
(45) Date of Patent: Apr. 23, 2002

(54) MOTOR MOUNTED SWITCH

(76) Inventor: Art Tateishi, 25 Warrender Avenue, Apt. #202, Islington, Ontario (CA), M9B 5Z4

( * ) Notice: Subject to any disclaimer, the term of this patent is extended or adjusted under 35 U.S.C. 154(b) by 0 days.

(21) Appl. No.: 09/654,478

(22) Filed: Sep. 1, 2000

(51) Int. Cl.[7] ........................ H02K 15/10; H02K 11/00; H02K 7/14; H01H 21/18; H01H 9/28
(52) U.S. Cl. ........................ 310/68 R; 310/43; 310/47; 310/50; 310/71; 310/68 A; 200/11 G; 200/51.17
(58) Field of Search ............................... 310/68 R, 42, 310/43, 47, 50, 66, 67 R, 69, 71, 68 A, 89, 90, 216, 217, 254, 258, 259, 260; 200/6 R, 11 G, 51.03–51.06, 51.17, 11 R

(56) References Cited

U.S. PATENT DOCUMENTS

| | | | | |
|---|---|---|---|---|
| 2,133,985 A | * | 10/1938 | Green | 310/47 |
| 3,748,419 A | * | 7/1973 | Torrey et al. | 200/155 R |
| 4,135,171 A | * | 1/1979 | Violet | 366/60 |
| 4,167,660 A | * | 9/1979 | Liedtke | 200/155 R |
| 4,340,829 A | * | 7/1982 | McCoy | 310/71 |
| 4,510,404 A | * | 4/1985 | Barrett et al. | 310/50 |
| 4,765,054 A | * | 8/1988 | Sauerwein et al. | 29/596 |
| 4,785,198 A | * | 11/1988 | Chin-Hsiang | 307/154 |
| 5,057,732 A | * | 10/1991 | Fukaya | 310/208 |
| 5,130,587 A | * | 7/1992 | Janisse et al. | 310/89 |
| 5,581,059 A | * | 12/1996 | Chang | 200/11 G |
| 5,728,982 A | * | 3/1998 | Rao et al. | 200/6 R |
| 5,811,745 A | * | 9/1998 | Hung | 200/11 R |

* cited by examiner

Primary Examiner—Nestor Ramirez
Assistant Examiner—Dang Dinh Le

(57) ABSTRACT

An electrical appliance which operates at multiple speeds includes a motor construction having a stator and a rotor which rotates within the stator. The stator includes a plurality of magnetic flux inducing wires coiled on different poles of the stator. The stator and the rotor are contained within a motor housing with the appliance further including a switch housing mounted directly to the motor housing. The flux inducing wires have wire ends which extend out of the motor housing and into the switch housing which includes receptors to receive the ends of the flux inducing wires and which also receive electrical contact members which secure and electrically connect with the ends of the flux inducing wires within the receptors of the switch housing.

20 Claims, 13 Drawing Sheets

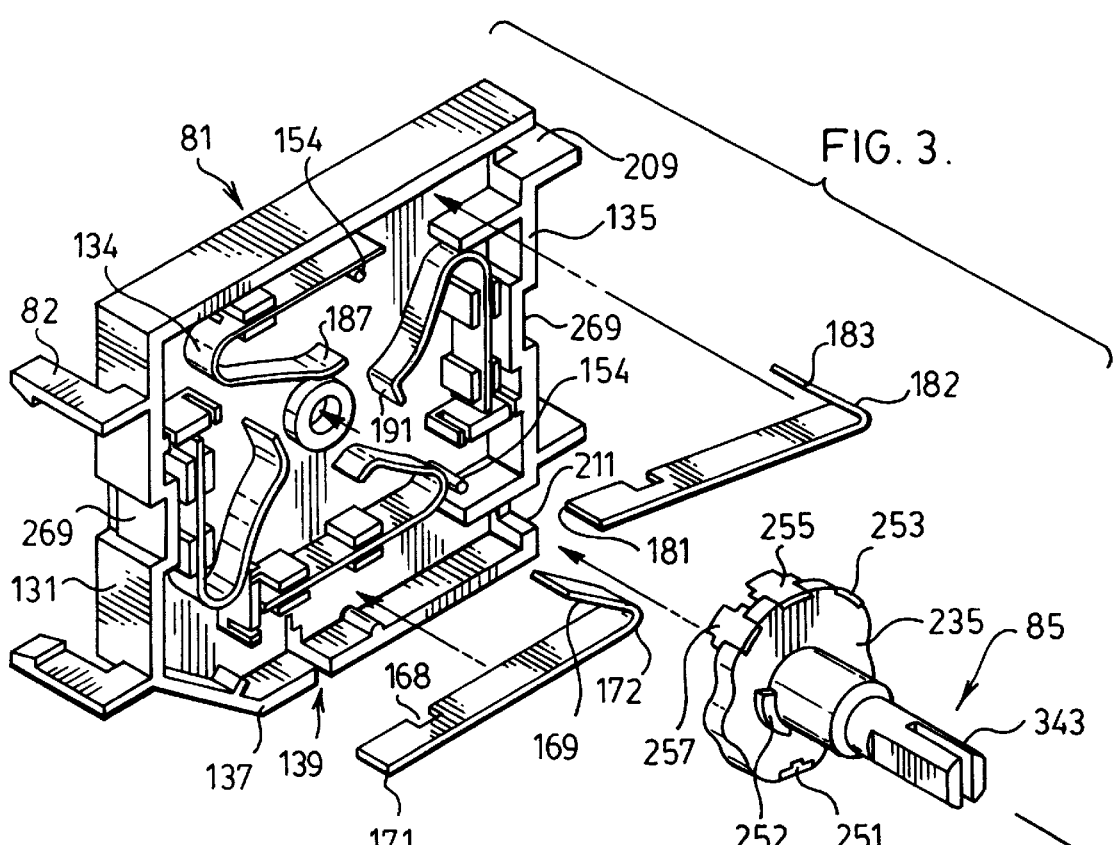
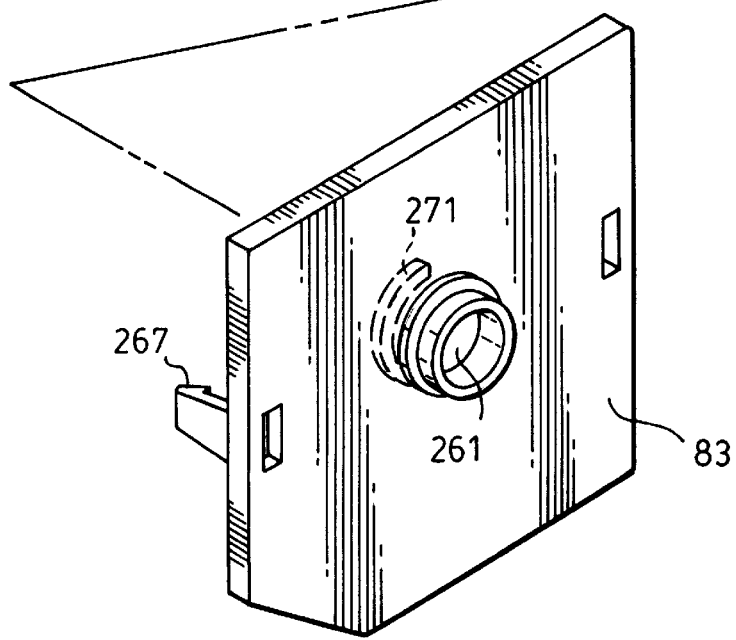
FIG. 3.

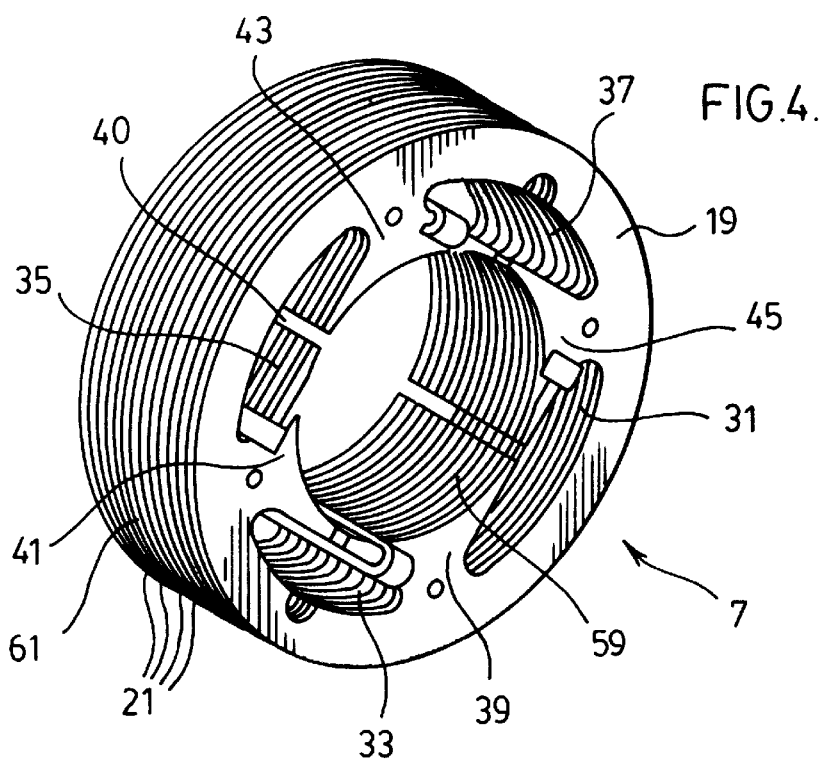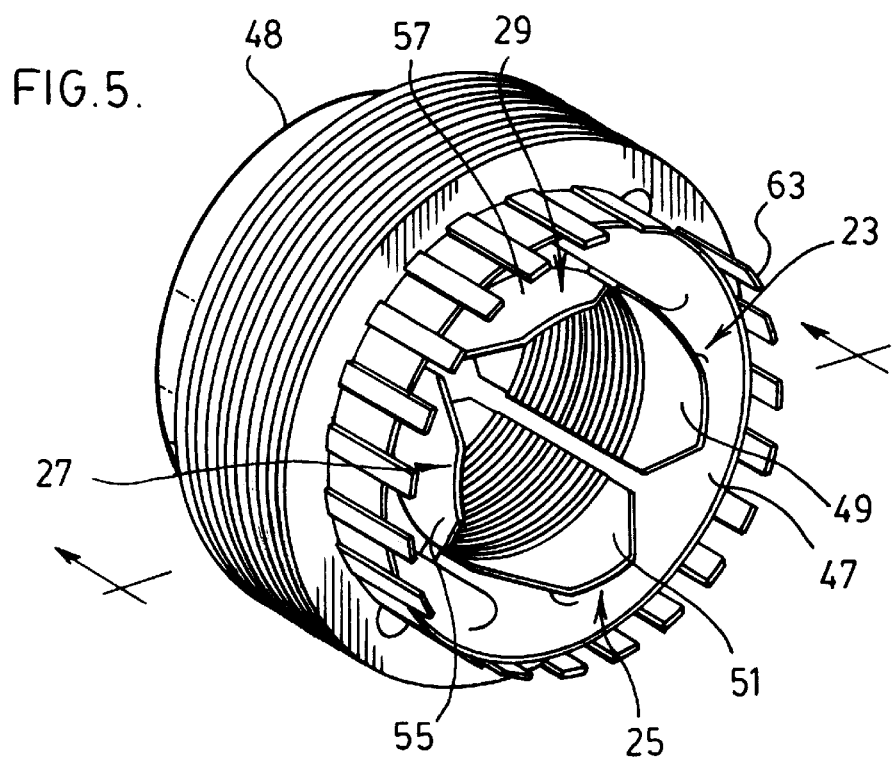

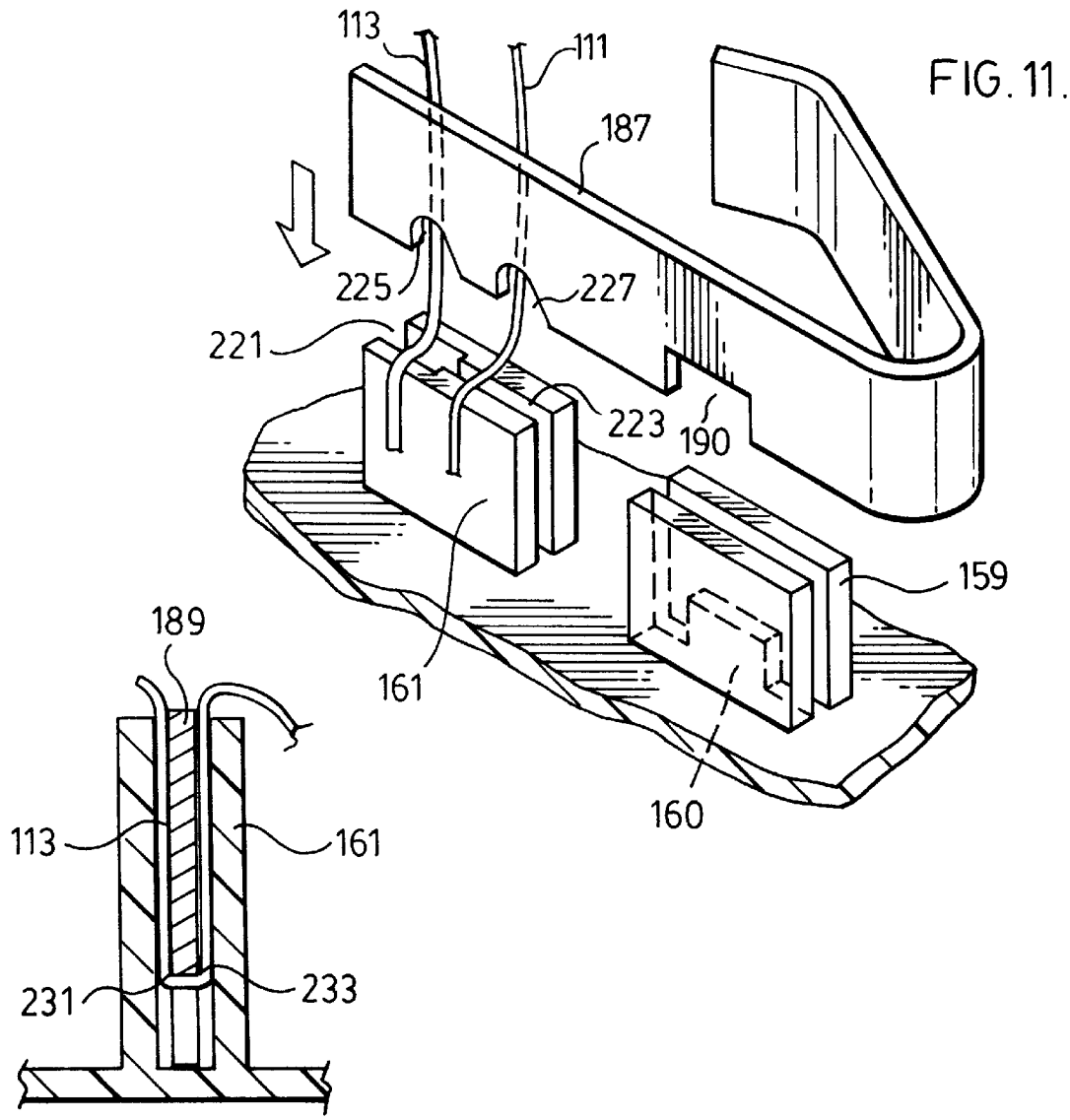

MOTOR MOUNTED SWITCH

FIELD OF THE INVENTION

The present invention relates very generally to a motor construction for use in an electrical appliance which operates at different motor speeds.

BACKGROUND OF THE INVENTION

Conventional manufacturing of electrical appliance motors is both time consuming and relatively expensive. For example, according to known methods of making a stator of a multiple pole motor there are difficulties in insulating the flux wires from the metallic body of the stator. Typically, the entire stator must be coated or treated with material such as fish paper to prevent the windings of the coil from contacting the stator body. The stator must then be capable of passing what is known in the industry as a High Pot Test. However, even after the above steps are taken, there is no guarantee that there may still not be areas of electrical conductivity between the stator and the flux wires which produce electrical shorting of the motor which will show up in the High Pot Test.

In addition to not necessarily being completely efficient, the above steps are also very labour intensive adding significantly to the cost of the motor.

Again, in a traditional electrical appliance motor, it is very difficult to maintain lubrication of the rotor in the motor. Traditional bearings may not be effective and may result in overheating of the motor.

A further difficulty encountered in the manufacturing of a standard electrical appliance motor relates to the actual wiring of the motor. Traditionally electrical leads or terminals are connected directly to the ends of the flux wires internally of the motor housing. The connections must be made either by crimping or soldering and insulating the terminal leads to the ends of the flux wires. Again, this is very labour intensive and substantially slows down the assembly time for the overall motor. In addition, it necessitates the use of relatively costly leads and additionally necessitates the use of expensive multipole switches that must then be mounted to a separate location on the appliance.

As a further drawback, electrical appliances such as electrically operated fans traditionally use mostly metal components which are all manufactured separately from one another and which then are typically secured by mechanical fasteners such as screws further adding to the cost of the appliance from both a material and a labour standpoint.

SUMMARY OF THE PRESENT INVENTION

The present invention provides a motor construction for an electrical appliance which essentially overcomes all of the drawbacks listed above with respect to traditional electrical appliance motor constructions.

More particularly, according to an aspect of the present invention, an electrical appliance, which operates at multiple speeds and which comprises a motor construction includes a stator and a rotor which rotates within the stator. The stator comprises a plurality of magnetic flux inducing wires coiled on poles within the stator. The stator and rotor are contained within a motor housing and the appliance further includes a switch housing mounted directly to the motor housing. The flux inducing wires rather than being connected to terminal leads within the motor housing have wires ends which extend out of the motor housing and directly into the switch housing. The switch housing includes receptors which receive the ends of the flux inducing wires and which also receive electrical contact members. These contact members secure and electrically connect with the ends of the flux inducing wires within the receptors of the switch housing.

According to another aspect of the invention, the stator of the motor construction includes a resin bobbin which is accurately injection molded to the main metallic body of the stator. This bobbin receives and isolate the magnetic flux wires from the metal body of the stator eliminating the separate dipping processes and the like which have been used in the past on a somewhat ineffective basis to prevent shorting between the windings and the stator.

The injection molding of the bobbin also eliminates the old requirement of riveting the entire stator parts together. This is not necessary in accordance with the present invention where the stator and bobbin are secured by the molding process.

According to still a further aspect of the present invention, the motor construction includes an extremely efficient lubricating bearing assembly adding longevity to rotor life.

According to yet a further preferred embodiment of the present invention a substantial part of the overall appliance including the bearing housing, the motor housing and the switch housing and switch body are all made from plastic in a single injection molding operation. This plastic is one with suitable electrical and mechanical properties to comply with OSHA standards and to pass UL and CSA testing. Furthermore, most of these components are ready to assemble with one another by automatic interlock fittings eliminating the requirement for separate mechanical fasteners throughout most of the overall appliance construction.

BRIEF DESCRIPTION OF THE DRAWINGS

The above as well as other advantages and features of the present invention will be described in greater detail according to the preferred embodiments of the present invention in which;

FIG. 3 is an exploded perspective view of a switch housing which mounts to the motor housing of the motor construction of FIG. 2;

FIG. 4 is a perspective view of a metallic stator body which is then injection molded with a resin bobbin as shown in perspective in FIG. 5 of the drawings;

FIG. 5 shows the stator with the injection molded bobbin

FIGS. 8 through 12 show enlarged details of the switch housing of FIG. 7;

DETAILED DESCRIPTION ACCORDING TO THE PREFERRED EMBODIMENTS OF THE PRESENT INVENTION IN WHICH

Figure 1:
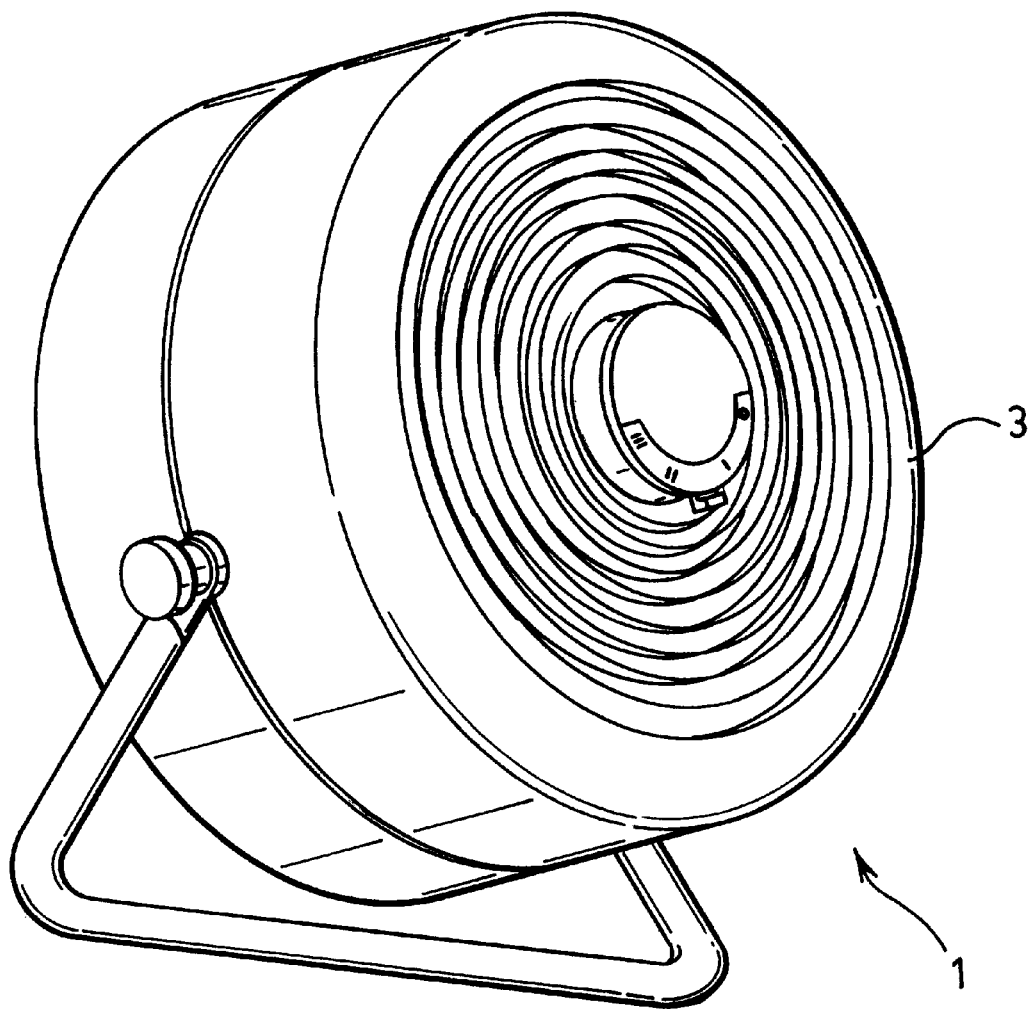
FIG. 1 is a front view of an electrical appliance and in particular, a multiple speed fan made in accordance with a preferred embodiment of the present invention.

FIG. 1 show an electrical appliance and specifically a multi-speed electric fan generally indicated at 1. This fan includes a main fan housing 3 containing internal components including a motor construction generally indicated at 5 in FIG. 2 of the drawings.

The motor construction is built around a stator generally indicated at 7 and a rotor 9 which rotates within stator 7. Rotor 9 includes shaft portions 11 and 13 which are trapped within and lubricated by the housing and lubricated at bearing regions for the motor which is formed by main motor housing sections 15 and 17.

FIG. 4 of the drawings shows the main metallic body portion 19 of stator 7. This metallic body portion is formed by a plurality of metallic layers 21 laminated to one another.

Figure 2:
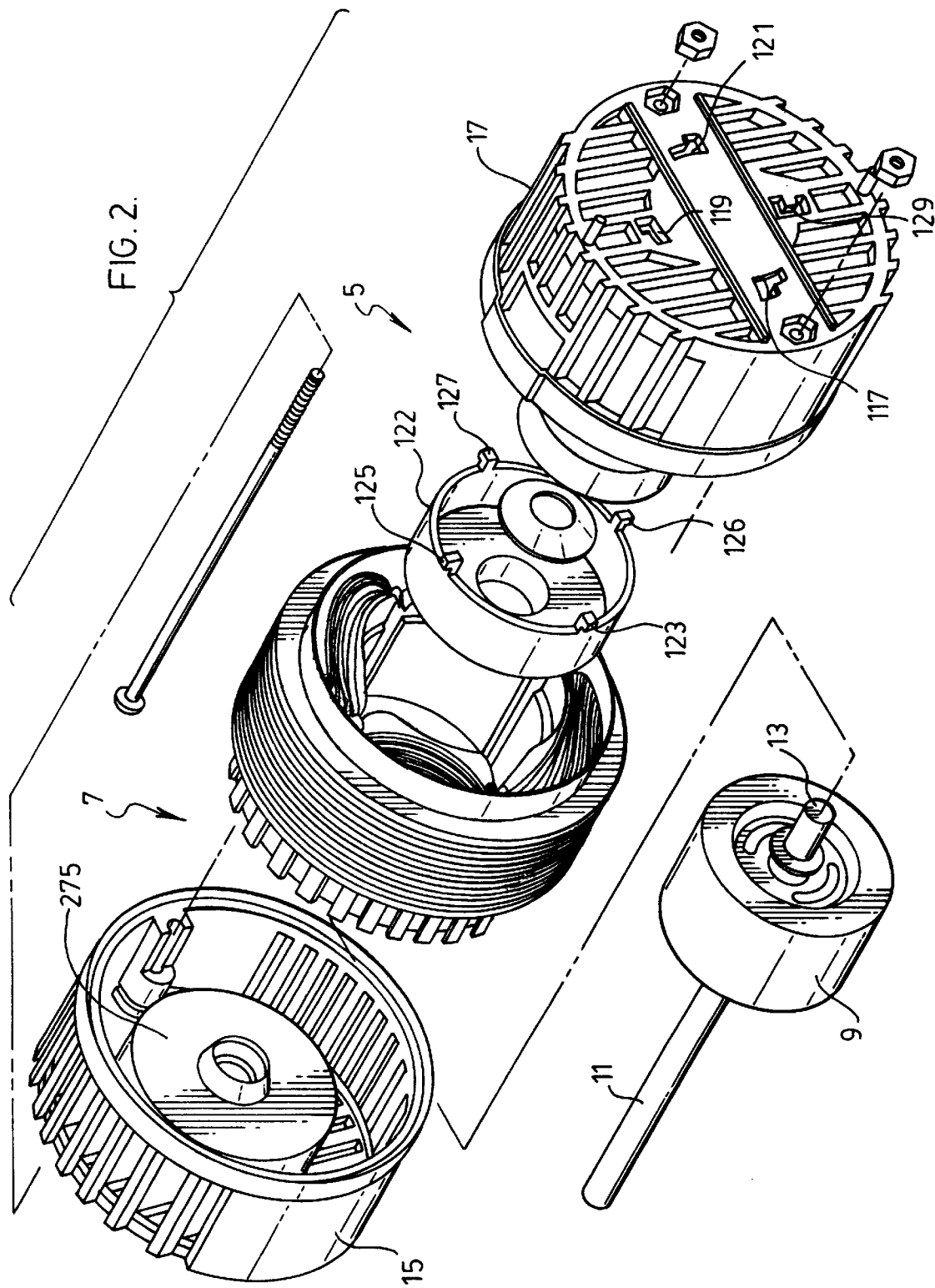
FIG. 2 is an exploded perspective view of the motor construction (without switch) of the fan of FIG. 1.

According to a preferred feature of the invention, the stator which, in this case, is used to form a four pole motor is completed by forming a bobbin have four separate winding regions 23, 25, 27 and 29 from resin material injection molded directly to the main stator body 19. Each of these winding regions receives flux inducing wire wound onto the bobbin as shown in FIG. 2 of the drawings and to be described later in greater detail.

Returning to FIG. 4, the main stator body 19 includes a plurality of open regions 31, 33, 35 and 37. These open regions are separated by Y-shaped arms 39, 41, 43 and 45. As will be seen in FIG. 4, each of the open regions includes a center slot such as, for example, slot 40 between the above mentioned arms into the open regions.

The resin material which is injection molded onto the main stator body completely covers the wall region of each of the open areas 31, 33, 35 and 37 and additionally covers the exposed side faces of the arms 39, 41, 43 and 45. The injection molded material does not go onto either the internal diameter surface 59 or the external diameter surface 61 of the main stator body. In fact, molding equipment shown in FIG. 6 of the drawings and again to be described below in detail, has been specifically designed in accordance with the present invention to prevent flashing of the injection molded material onto these surfaces.

The injection molded material in addition to covering the surface areas described above forms continuous rings 47 and 48 protruding to either side of the main stator body. In addition, the injection molded material forms protruding bobbin portions faced inwardly from the continuous rings 47 and 48 to either side of the stator body. FIG. 5 shows these bobbin portions at 49, 51, 55 and 57 with similar bobbin portions being provided to the other side of the stator body.

The flowing of the injection molded resin material to all of the areas described immediately above produces the stator in manner such that the bobbin receives the magnetic flux wiring with essentially no likelihood of the flux wire coming in contact with any metallic surfaces on the stator.

FIG. 5 shows that the injection molded material is additionally formed into bobbin posts or pins 63 spaced from one another around the continuous ring 47 to one side of the stator. These posts are very helpful during the process of coiling the magnetic flux wires on the winding regions of the stator.

Figure 6:
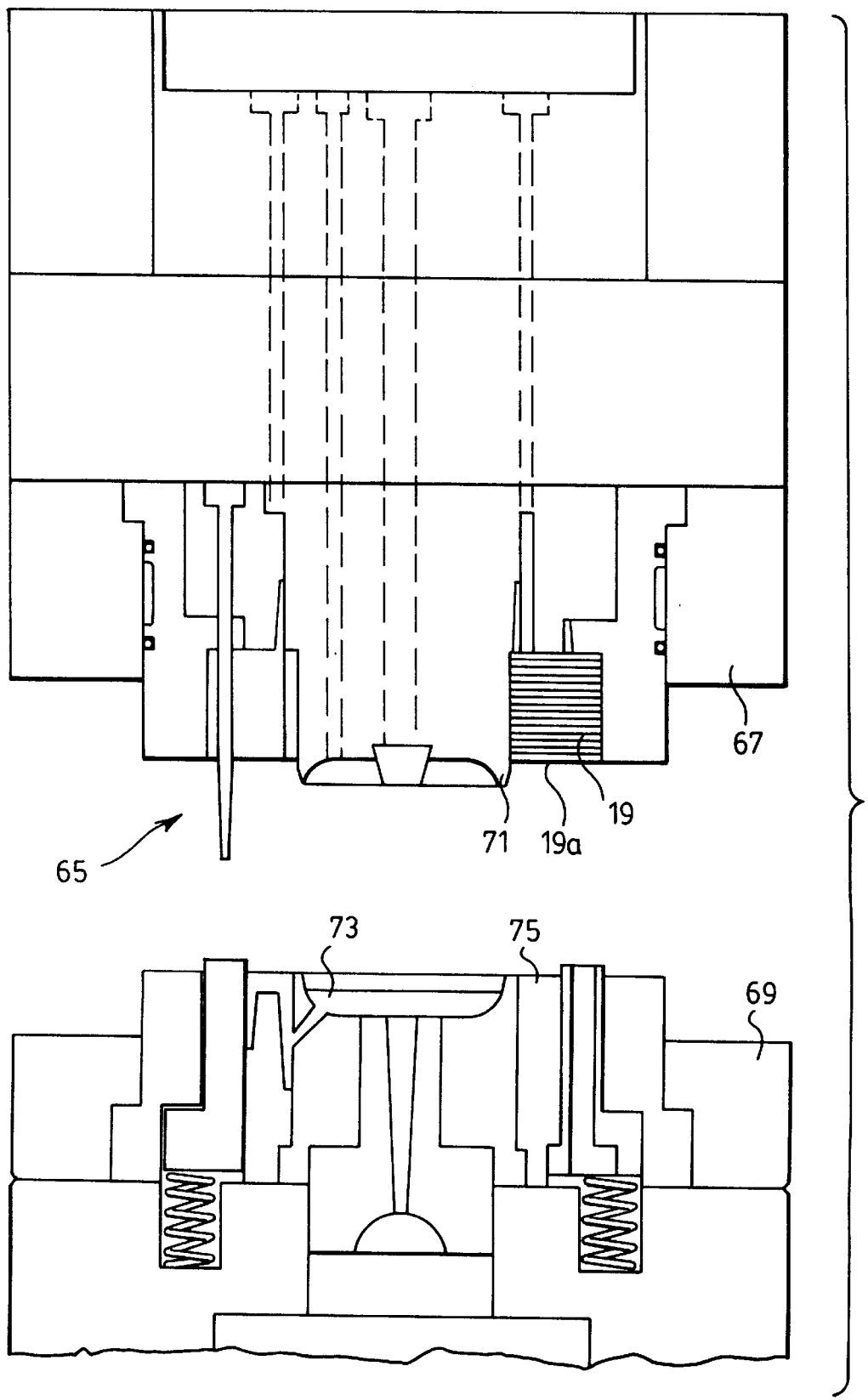
FIG. 6 is a sectional view of a mold used to form the stator with the injection molded bobbin of FIG. 5.

FIG. 6 of the drawings, shows a molding apparatus generally indicated at 65 specifically designed to produce the injection molded bobbin on stator 7.

As earlier mentioned the flow of the injection molded material onto the main stator body is well controlled so as not to cover the internal and external surfaces 59 and 61 of the stator body. These surfaces, particularly surface 59 within which the rotor turns, must remain clear of any flashing of the plastic to assure proper motor operation.

As earlier noted, the stator body is formed of metallic layers 21 laminated to one another. In the preferred construction of the motor, there are in fact 35 laminations and each of these laminations is desirably $25/1000$ inch in width. If the construction of the main stator body 19 is exact this produces an overall width of $7/8$ inch. However, the width of the laminations is not necessarily exact and because there are so many laminations, there may be a considerable tolerance in the overall width of the main stator body. Injection molding apparatus 65 is specifically designed to take these tolerances into consideration.

More particularly, molding apparatus 65 includes first and second mold sections 67 and 69 respectively. The metallic stator body 19 locates within mold section 67. This mold section includes a protruding center region 71 while mold section 69 includes a recessed center region 73 to receive the center region 71 of mold section 67.

When the mold is in operation, center region 71 of mold section 67 goes through and beyond the stator body and completely blocks off the interior surface 59 of the stator. The exterior surface of the stator is blocked off by mold part 68. This prevents flashing onto these two surfaces.

However, there is a potential problem if the stator is thicker than what is shown. Normally the thick stator would block closure of the mold. This does not occur with the mold shown in FIG. 6. This is because mold part 75 of mold section 69, against which the stator locates, is spring loaded to move downwardly under pressure from the stator. This in turn allows the parting faces of the two mold sections to meet with one another for full mold closure.

With the mold operating as described immediately above, there is sufficient compensation to adjust to a tolerance of a full lamination of the stator body. Any excess plastic material accumulates on stator surface 19a where it has no effect on the motor performance.

Turning now to the wiring of the motor, magnetic flux inducing wire is wound onto the bobbins of the stator as earlier described. In accordance with a preferred feature of the present invention, the stator as also earlier described includes four winding regions to produce a four pole motor. Each of these winding regions is wound with three insulated wires comprising a relatively thick wire and two relatively thin wires. These wires are visibly different so that they can be distinguished from one another.

The direction of the winding of the wires is reversed from one pole to the next. This is standard wiring procedure in a multiple pole motor. However, also in accordance with standard winding procedures, a loop of each wire must be held on a separate wire holding device between each pole in order to reverse the direction of the wire winding. This leaves protruding wire loops which must be dressed to avoid contact with the moving parts of the motor. Such dressing is a labour intensive expensive step in the motor construction.

In accordance with the present invention, the reverse winding of the wires is achieved in a much more efficient manner in that no separate wire loop holding device is required. Instead, the reversing of the winding is achieved using bobbin posts 63 directly on the stator. During the winding operation, the flux wires before being reversed in direction of winding are looped directly over an appropriately positioned one of the bobbin posts.

The actual winding equipment is set up to ensure that one of the posts 63 will be exactly located in a position to receive the wires as they move between and reverse on adjacent winding regions of the bobbin. The wires are pulled tightly onto the bobbin posts eliminating any excess wire loops.

Figure 7:
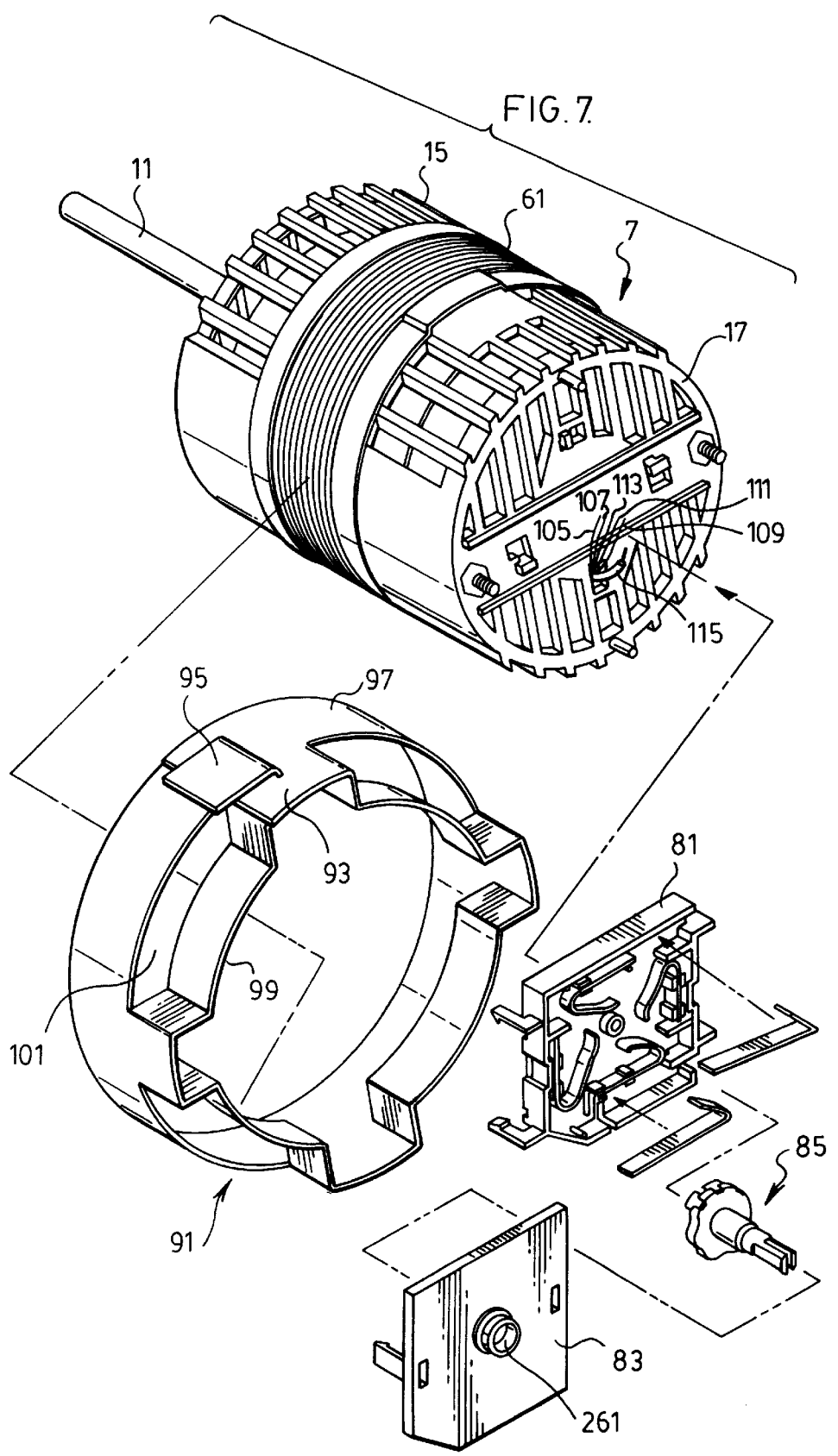
FIG. 7 is a partially exploded perspective view of the motor, construction (with switch) of FIG. 2.

FIG. 7 of the drawings shows that the stator generally indicated at 7 when fitted with the motor construction is sandwiched between motor housing parts 15 and 17. Here it will be seen that the external surface 61 of the stator is exposed for heat dissipating purposes.

The motor housing parts 15 and 17, like many of the components of the fan including the fan housing 3 are made from plastic material having appropriate electrical and mechanical properties.

However, this plastic material, while being particularly suitable for ease of assembly, does not have good heat conductivity properties and is therefore not designed to dissipate heat from the fan motor. However such a heat build up problem is avoided through the provision of a heat sink member generally indicated at 91 in FIG. 7 of the drawings. This heat sink member is made from a thin band of conductive bendable preferably aluminum material initially formed as a flat strip. The flat strip is then shaped to a generally circular configuration where the opposite ends 93 and 95 of the band are interlocked with one another to hold the circular configuration. Specifically, end 93 is provided with a slot and end 95 comprises a tab fitted through the slotted end 93 and bent, as shown in FIG. 7, to remain interlocked. From here the band is punched or pressed inwardly to provide gripping sections 99 which engage with the outer surface 61 of stator 7. The metallic band further includes larger diameter sections 97 with air flow regions 101 between these sections and the gripping sections 99.

The gripping sections 99 of the heat sink pick the motor heat directly up off of the metal body of the stator and this heat is then transferred completely over the surface of the heat sink. The air flow regions 101 provide open areas through which air is moved outwardly of the fan by the fan blade providing the desired heat dissipation.

FIGS. 8 through 15 of the drawings show a very unique feature of the present invention which overcomes the need to use separate leads or terminals from the magnetic flux wires to a remotely located switch as has been the case with prior art motor constructions. In accordance with the present invention, the switch for operating the motor is built directly at the motor.

More particularly, FIG. 6 shows a plurality of wire ends 105, 107, 109, 111 and 113 protruding from motor housing part 17. Also protruding from housing part 17 is a fuse 115. As earlier noted, in the preferred embodiment of the present invention, the motor has three magnetic flux inducing wires including a thicker gauge wire and two thinner gauge wires. Fuse 115 is secured internally of motor housing part 17 to one end of the thicker gauge wire while the other end 113 of the thicker gauge wire extends out of the motor housing part. Wire ends 105, 107, 109 and 111 comprise the opposite ends of the two thinner gauge wires.

From the description above, it is to be understood that the only electrical connection made interiorly of the motor housing is the connection between fuse 115 and the one end of the thicker gauge wire, otherwise, all of the wire ends from the flux wires are brought directly out of the motor housing. This eliminates the costly and slow step of having to crimp or solder and insulate additional leads to the flux wires internally of the motor housing.

FIG. 2 shows that motor housing part 17 is provided with small openings 117, 119 and 121 to receive interlocking feet 123, 125 and 127 of a bearing housing 122 shown in FIG. 2 of the drawings. This figure also shows that motor housing part 17 includes an additional opening 129 part of which is identical to openings 117, 119 and 121. In addition opening 129 is enlarged by simply removing a small piece of the motor housing. This results in an opening large enough to pass opening the flux wire ends as well as the fuse 115 outwardly of the motor housing. In addition, opening 129 is still able to function as a lock region for a further locking foot 126 of bearing housing 122.

Figure 8:
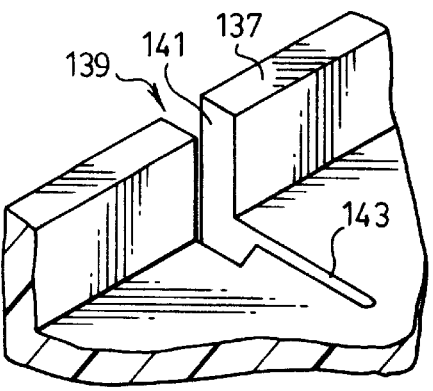
Figure 9:
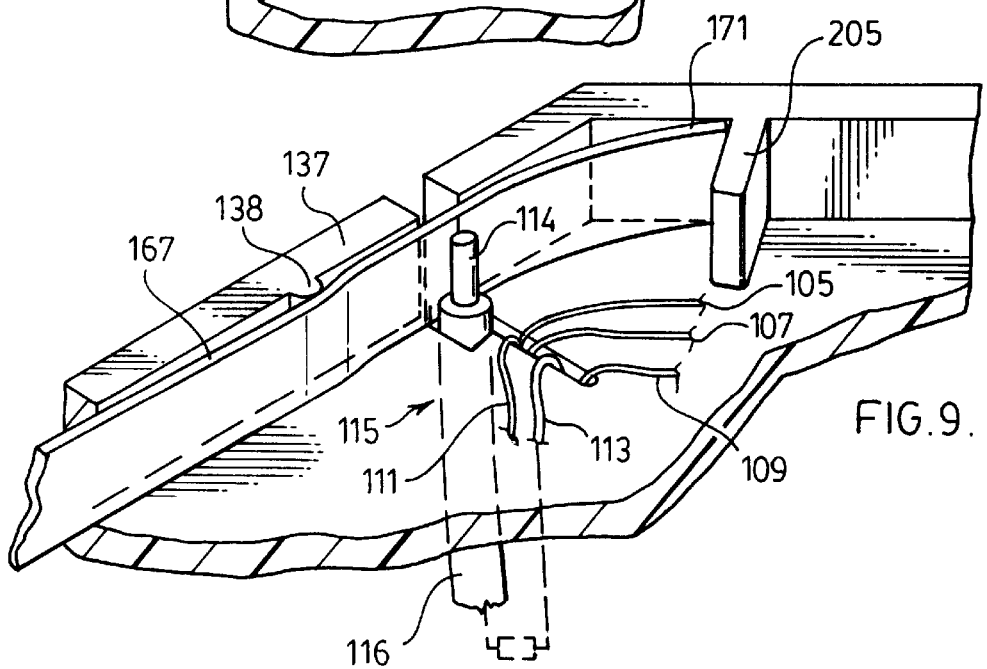

Switch housing 81 is set up to receive the flux wires and the fuse directly from the motor housing. Referring to FIGS. 3, 8 and 9 of the drawings, it will be seen that the switch housing includes a bordering wall comprising wall portions 131, 133, 135 and 137. A wire and fuse passage 139 is provided through wall portion 137. As best shown in FIG. 8, passage 139 has a relatively wide slot 141 through the wall narrowing to a much thinner slot 143. The wide slot 141 allows the fitting of the fuse 115 directly into the switch housing from the motor housing and the narrower slot 143 receives the five wire ends 105, 107, 109, 111 and 113 as best shown in FIG. 9 of the drawings. These flux wire ends are then taken to and electrically connected with electrical contact members of the switch housing. These contact members drive the wire ends into specifically designed receptors which frictionally engage both the wire ends and the contact members. All the electrical connections for the switch are made by the insertion of the electrical contact members in a very easy and efficient manner without requiring the use of additional components such as wire crimps or solder to fuse the wires to one another.

Figure 14:
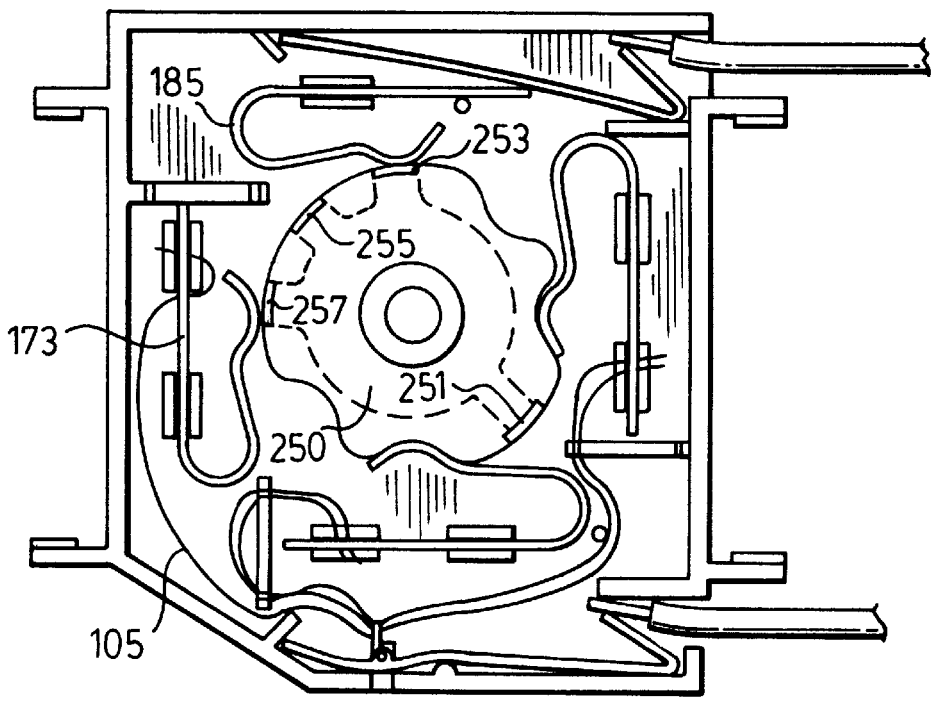
Figure 15:
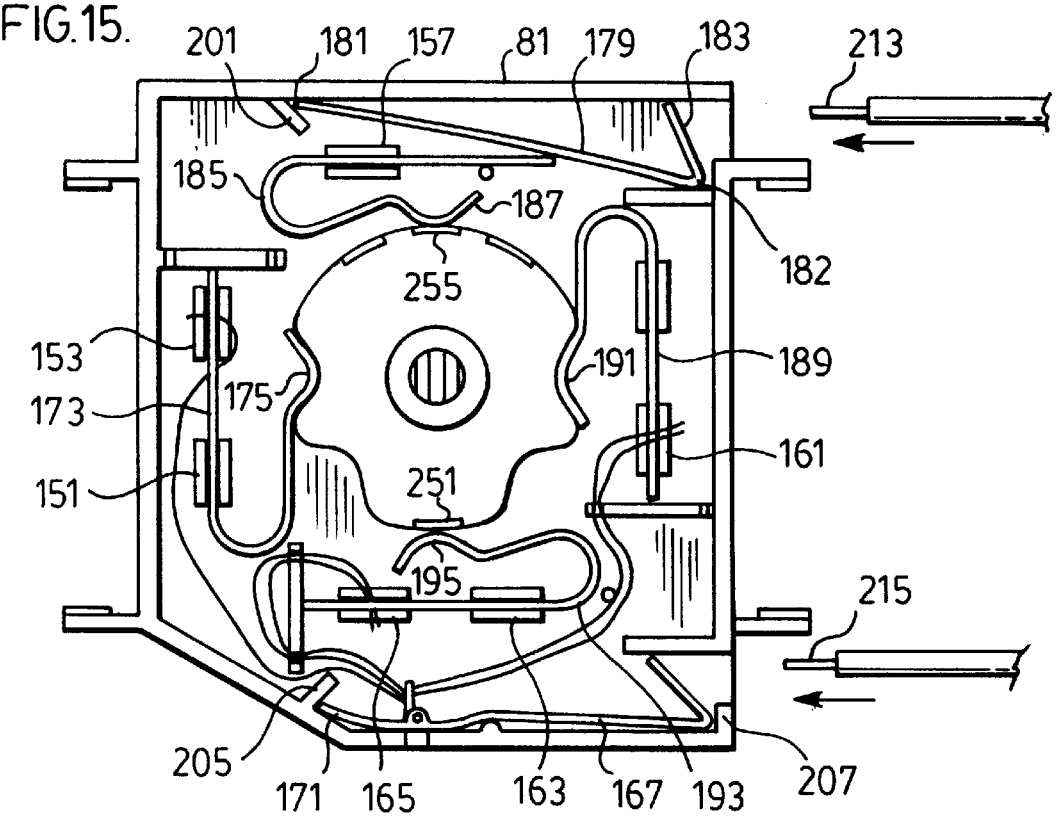
Figure 16:
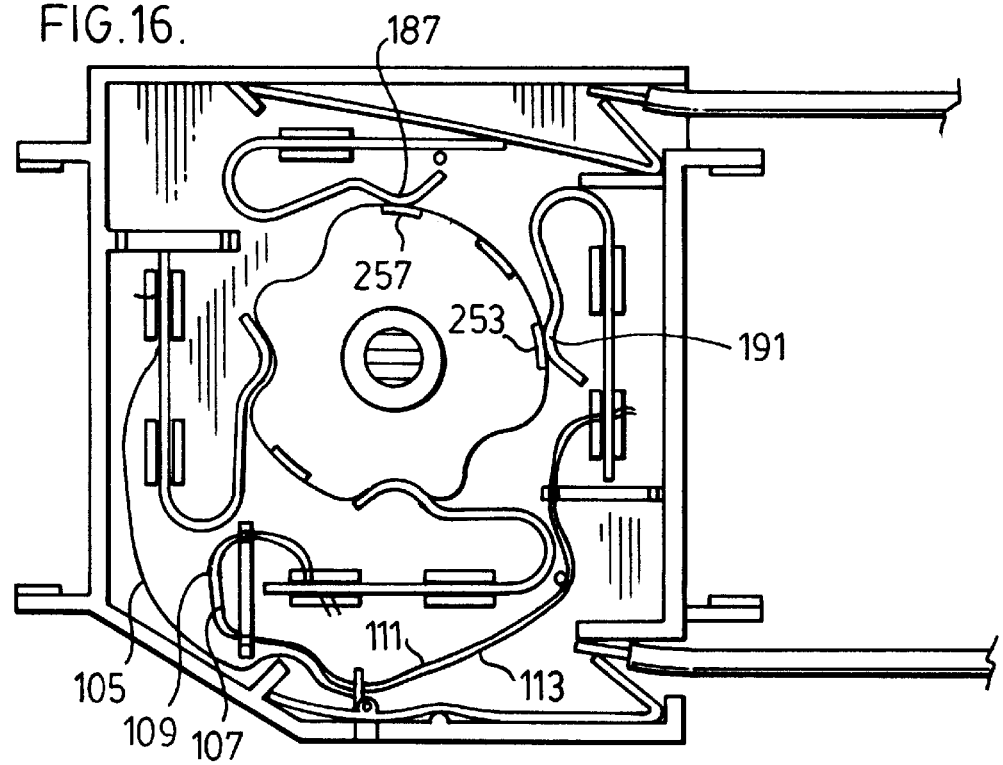

Before going into detail regarding the immediately above point, the path of the switch wiring is best seen having reference to FIGS. 14 through 16 of the drawings. These figures show that the switch housing 81 includes a plurality of receptors comprising receptors 151, 153, 157, 159, 161, 163 and 165. The drawings show that end 113 of the heavier gauge flux wire along with one end 111 of one of the thinner gauge flux wires go to receptor 161. The ends 107 and 109 of the thinner gauge wire go to receptor 165 and the one end 105, again of the thinner gauge wire, goes to receptor 153. This provides the wiring diagram used in conjunction with various different positions of switch 85 for on/off and different speed operations of the fan to be described later in detail.

The electrical contacts located within switch housing 81 comprise a plurality of identical somewhat U-shaped contact members 193, 173, 185 and 189. Additional elongated contact members 167 and 179 which again are identical in construction are also located within the switch housing.

Contact member 179 has its opposite ends 181 and 182 wedged against internal walls 201 and 203 of the switch housing. This contact further includes a return portion 183 giving the end 182 of the contact a somewhat V-shaped appearance.

Contact 167 has its opposite ends 171 and 172 trapped between internal switch housing walls 205 and 207. This contact again has a return portion 169 reversing in direction from its end 172 in a V-like configuration.

Switch housing 81 has a pair of sidewall openings 209 and 211 near the ends 172 and 182 of contacts 167 and 179. The electrical appliance which runs off alternating current from a standard wall outlet has an AC cord formed by a first cord wire 213 which passes through opening 209 into the switch housing and a second cord wire 215 which passes through opening 211 into the switch housing. One of these wires is the live wire and the other wire is the neutral or ground wire. Note that both wires are sheathed, other than where they connect, within the switch housing as described below.

Figure 13:
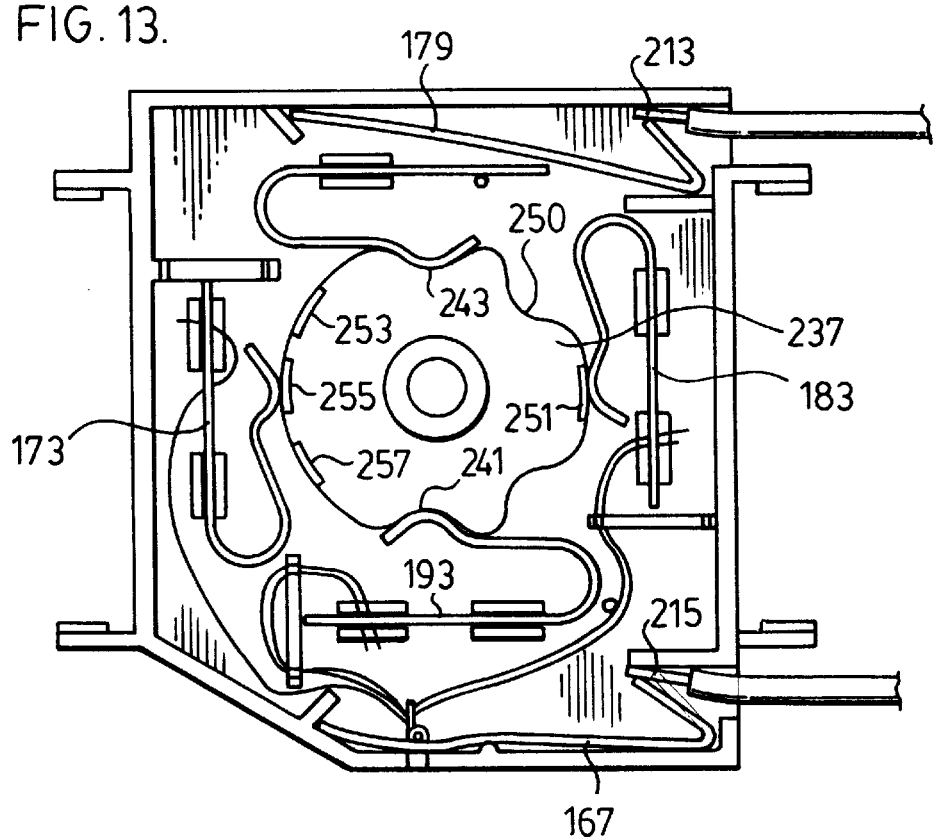
FIGS. 13 through 16 are front views of the assembled switch housing including the switch body in its various different operating positions.

As can be well seen in FIGS. 13, 14 and 16, AC cord wire 213 is pinched into position within the switch housing by return portion 183 of contact member 179 while AC cord wire 215 is pinched into position within the switch housing by return portion 169 of contact member 167. The gripping action of these two contact members is more than sufficient to properly secure the AC cord with the switch housing from the FIG. 15 insertion position because the cord at a different location away from the switch housing wraps onto a cord interlock on the fan housing. This cord interlock absorbs tension on the cord outside of the fan eliminating any pull on the cord wires where they are pinched into the switch housing.

Figure 10:
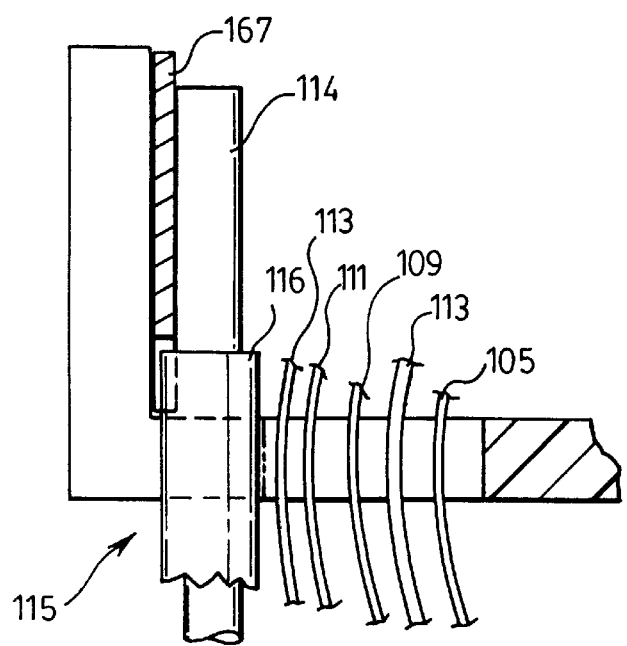

FIGS. 9 and 10 show in greater detail how electrical contact member 167 fits within the switch housing and additionally how this particular contact member electrically connects with the fuse 115.

The fuse itself is formed by an electrically conductive center portion 114 covered by an insulating sheath 116. The insulating sheath extends from the motor housing into the switch housing as shown in FIG. 10 so that there is no exposure to the electrically conductive portion 114 of the fuse other than internally of the switch housing.

The wall portion 137 of the switch housing is provided with a small protrusion 138 which when contact 167 is fitted into the switch housing pushes the contact member off of wall 137 and onto the electrically conductive portion 114 of fuse 115. This pushing of the contact member at the conductive portion of the fuse is also assisted by the tension placed on the end 171 of contact member 167 at internal housing wall 205.

Here it should be noted that all of the contact members are under tension within the switch housing. Specifically provided tension posts, such as post 154 seen in FIG. 3 put pressure on the U-shaped contacts. The other U-shaped contacts are subject to the pressures earlier described. This ensures that these contact not only hold in stable positions within the motor housing, but also that they remain electrically connected with each of the wire s as described below.

In order for the main body of contact member 167 to clear over the insulating sheath 116 of the fuse, the contact member is provided with a cut out or recess 168 best seen in FIG. 7 of the drawings. This cut out prevents interference between contact member 167 and fuse insulation 116 allowing the main body of the contact member to drive against conductive portion 114 of the fuse as shown in FIG. 10 of the drawings. This figure as well as FIG. 9, also shows the fuse, held tightly in position as by contact 167 acts as a blocking member to prevent any of the wires from escaping slot 143.

The somewhat U-shaped contact members 173, 189 and 193 each cooperate with two of the receptors. In the case of contact member 173, these receptors are receptors 151 and 153, in the case of contact member 189, these receptors a re receptors.159 and 161 and in the case of contact member 193, these receptors are receptors 163 and 165. Contact member 185 cooperates with the single receptor 157.

The receptors 153, 161 and 165 are used to receive the different wire ends as described above. The trapping of the wire ends within these receptors is completed by the actual switch contact members 173, 189 and 193 respectively. Note that receptor 157 is used strictly for the purpose of receiving contact 185 which is electrically connected to AC cord wire 213 through electrical contact member 179.

The actual trapping of the flux wires within the receptors is a feature unique to the present invention. This feature is well demonstrated having reference to FIGS. 11 and 12 of the drawings. These particular figures show how electrical contact member 189 traps the flux wire ends 111 and 113 and further how electrical contact is made both with the contact member and between the wire ends.

Both of the receptors 159 and 161 comprise raised housing parts separated by a slot. In the case of receptor 159, this slot is consistent in width over the length of the receptor. In the case of receptor 161, the slot comprises a first slot region 221 and a second slot region 223. Slot region 221 is slightly wider than slot region 223.

Contact member 189 includes a pair of notches or grooves 225 and 227. The se notches or grooves provide locators for the two wire ends 113 and 111 respectively.

Contact member 189 additionally includes a rectangular recess 190 while receptor 159 includes a correspondingly shaped riser 160 at the bottom of the slot in receptor 159. This riser provides an accurate location of contact member 189 as it slides up into the notch in the contact member as the contact member is pushed downwardly into the slot of receptor 159. At the same time, the other end of the contact member is pushed down into receptor 161. The curved shaping of the two notches 225 and 227 ensures that the flux wire ends 113 and 111 are firstly drawn into and then centered relative to these notches as the wire ends are driven by the electrical contact down into receptor 161. The width of the two slot portions 221 and 223 are specifically dimensioned to accommodate both the thickness of the body of the electrical contact member as well as the varying thicknesses of the two wire ends. The fitting of the contact member along with the wire ends into the receptor is such that both are wedged firmly in place without having to provide any additional securing other than the switch housing cover, to hold the contact member in position.

Slot region 221 is wider than slot region 223 to accommodate the width of the electrical contact member plus the increased width of the thicker gauge wire end 113. Conversely, slot portion 223 is narrower because the wire end 111 is a thinner gauge wire. Accordingly, both slot regions are specifically sized to ensure a snug fitting of the contact and the wiring within the receptor.

Contact members 193, 173 and 185 are all notched similar to notch 10 and contact member 189. The receptors 163, 151 and 157 will also have risers identical to riser 160 in receptor 159 to engage within the rectangular notches on the contact members. The fitting of the contact members with the risers ensures accurate location of all of these contact members relative to one another.

Contact member 193 includes notches identical to notches 225 and 227 provided on contact member 189 to guide the fitting of the two thinner gauge wires 107 and 109 into receptor 165. However, the slot in receptor 165 is consistent in width over its entire length since both of the wires going into this receptor are of the same thickness or gauge. Receptor 153, also has a uniform width slot to receive the single flux wire end 105.

A further important feature of the present invention is seen in reference to FIG. 12 of the drawings. Each of the flux wire ends 105, 107, 109, 111 and 113 comprises an internal conductive wire covered by insulation material. This again ensures that the wire does not make any inadvertent electrical contact other than where desired.

As any one of the electrical contact members drive the respective wire ends down into the receptors, as shown by contact member 189 driving wire 113 down into receptor 161 in FIG. 12, the contact member cuts through the insulating material to the conductive wiring in the wire end. The cutting action is sufficient to break through the insulation material with out actually cutting the internal wiring.

This action of the contact member cutting into the wire fulfills two functions. Firstly, it exposes the conductive portion of the wire to the contact and secondly, it provides an automatic electrical connection between the contact member and the wire without the requirement for crimping or soldering. Further, in a situation where there are two wires associated with a single contact member such as wires 111 and 113, the contact member provides an electrical connection not only with each of the wires but also between the two wires.

As a further feature referring once again to FIG. 12 of the drawings, the contact member actually cuts through the insulating material on the wire end at two locations indicated at 231 and 233 to opposite sides of the main body of the contact member. This further increases the likelihood of a good electrical contact between the contact member and the now bared conductive portion of the wire.

Figure 3A:
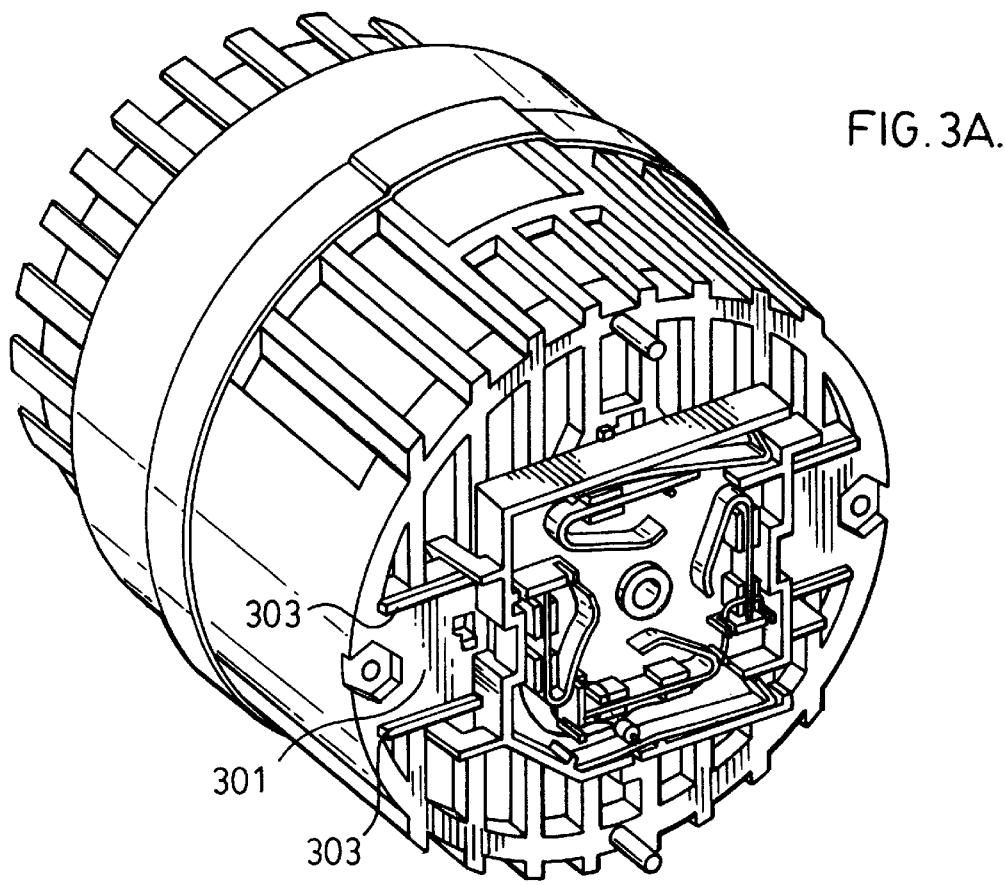
FIG. 3A is a perspective view of the switch housing (without cover) mounted to the motor housing.

The actual sequence for assembling the switch housing with the motor housing is best seen having reference to FIG. 7 of the drawings. Before the entire motor is assembled, the flux wire ends and the fuse are brought directly out of the motor housing as earlier described. After this, the switch housing 81 is attached to the motor housing as shown in FIG. 3A. The actual attachment is provided by means of flexible barbed legs 82 on the switch housing which engage with housing portion 17. From here, the flux wire ends as well as the fuse are fitted into the slot openings 141 and 143 of the switch housing wall 139 with the wire ends then being wired into the switch housing as earlier described.

It is important that the switch housing be accurately and securely held to the motor housing. To achieve this, the motor housing includes a center housing part 301 seen in FIG. 3A. Part 301 is bordered to either side by raised ribs 303. The switch housing 81 includes a pair of slots 305 on its back surface. These slots receive the ribs 303 while the barbed legs 82 locate to opposite sides of housing part 301 locking the switch housing from moving relative to the motor housing.

After the wiring of the switch housing has been completed, the actual rotor of the switch body 85 is fitted within the switch housing.

Switch body 85 as best seen in FIG. 3 of the drawings comprises a larger diameter switch portion 235 with an undulating or non-uniform peripheral surface. This peripheral surface comprises a first region 237 and a second region 239 to opposite sides of switch portion 235. A pair of indented regions 241 and 243 separate regions 237 and 239. An electrically conductive, preferably brass, skirt 250 seen in dotted lines in FIG. 14 fits on the front face of switch portion 235, This skirt includes a single electrically conductive arm 251 wrapping over the side of switch portion region 237 and three further electrically conductive arms 253, 255 and 257 wrapping over the side edge of region 239 on switch portion 235. These arms hold the skirt with the switch body.

The switch housing as best shown in FIG. 3 includes a center opening 134 and the switch body includes a small rounded node which locates within this opening. In addition, the electrical contact members include spring portions 175, 187, 191 and 195 which push on the enlarged portion 235 of switch body 85 when the switch body is fitted into the housing as shown for example in any one of the FIGS. 13 through 16.

Figure 17:
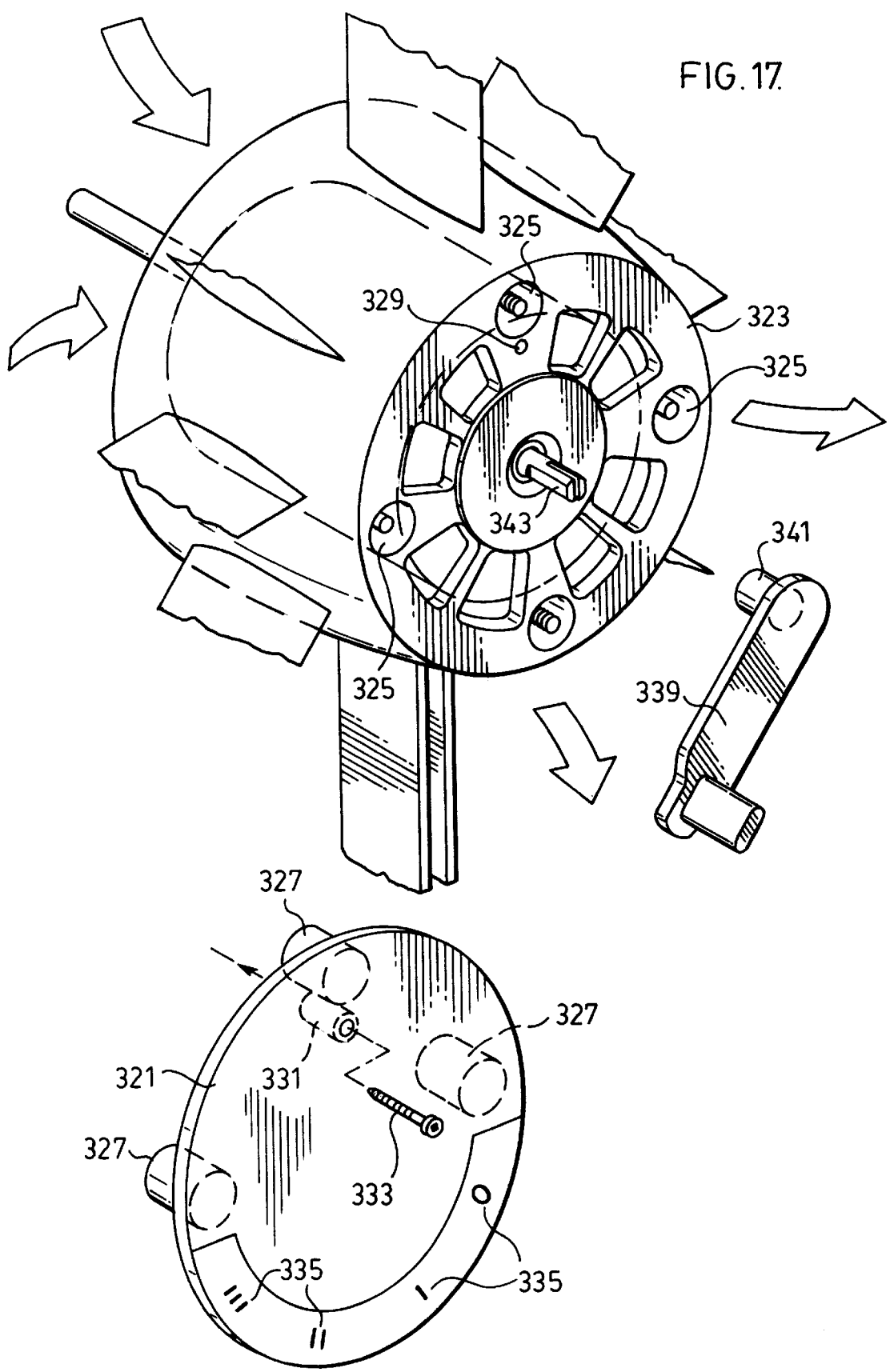
FIG. 17 shows, in perspective, different manual controls for operating the motor from the fan of FIG. 1.

The overall assembly of the switch housing is then completed by the switch cover 83. This switch cover includes a center opening 261 which fits over the extended shaft 343 of switch body 85. This allows the shaft 263 to extend in line with the motor out through the center of the fan housing as shown in FIG. 17 to receive a manual control for on/off operation and changing speeds of the motor. It is to be noted that the control is in a very accessible location directly at the front of the fan and hooks through a direct rotational drive to the switch body within the switch housing.

The switch housing cover 87 is additionally provided with flexible barbed arms 267 which slide along recesses 269 to opposite sides of the switch housing and which releasably lock against the opposite side of the switch housing.

Figure 3B:
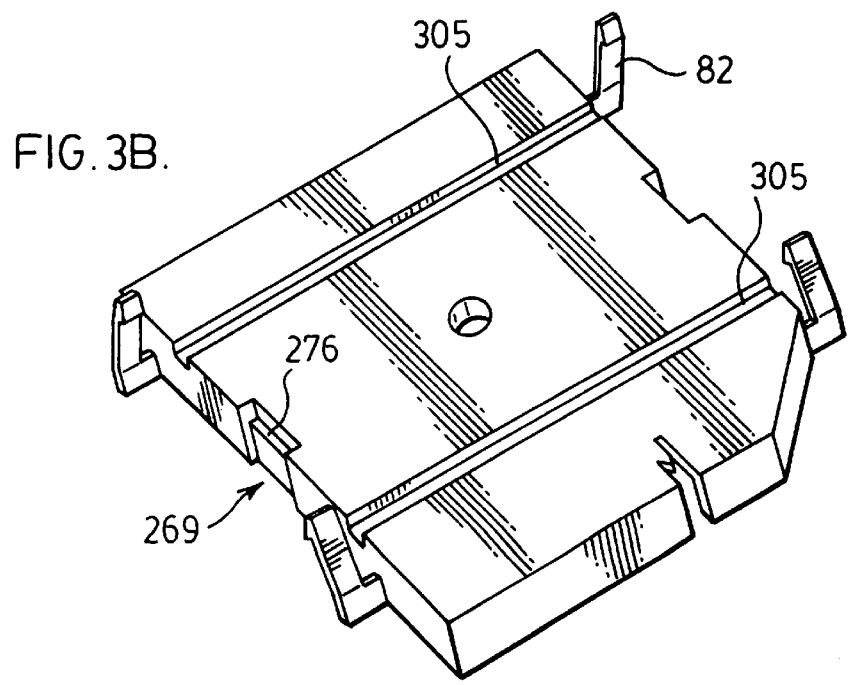
FIG. 3B is a rear perspective view of the switch housing.

To describe the locking of the switch housing cover in greater detail, reference is had to FIG. 3B. Here it will be seen that recesses 269 terminate with a deeper recess portion 270 leaving a ledge between the more shallow and the deeper recess. This ledge provides the locking surface for the barbed arms 267 of the cover without interference from the motor housing.

In the particular motor construction as shown in the drawings, electrical fan 1 has an off position, a low speed, a mid-speed, and a high speed operating position. This is achieved through the use of the four poles of the motor with the three flux inducing wires wound on those poles. The actual switch positions for the desired fan setting are shown in FIGS. 13 through 16 of the drawings.

Having reference first to FIG. 13, this particular figure shows the off position for the fan motor. Here it will be seen that no electrical contact is made across the switch between either of the AC wires 213 and 215 and any of the electrical contacts 173, 193 or 189.

In FIG. 14 it will be seen that the switch has been rotated one position such that the electrical arm 253 on the switch body is against live contact member 185 while electrical arm 257 on switch body portion 235 lies against electrical contact member 173. This then provides an electrical connection between the one thin gauge wire 105 and AC cord wire 213 for the low speed operation of the fan.

Turning to FIG. 15, the switch has been rotated one more position where electrical arm 255 on the switch body now lies against live contact member 185 while electrical arm 251 lies against contact member 193. This switch position connects the two thin gauge wires 107 and 109 with AC cord wire 213 for medium speed operation of the fan.

The high speed operation of the fan is shown in the switch position of FIG. 16. In this position, electrical arm 253 on switch portion 235 pushes against contact member 183 while electrical arm 257 drives against contact member 185. This provides an electrical connection between the AC wire 213 and flux wires 111 and 113. Flux wire 113 is specifically made of an increased thickness for increased electrical flow from the operation of the rotary motor to electrical contact 183 resulting in the higher electrical output from this particular contact which translates into higher fan speed.

The switch position shown in FIG. 16 is as far as the switch will rotate in the clockwise direction. Any further rotation of the switch body in this direction is prevented by cooperating stops on the switch body and the switch housing cover. The switch body includes a first stop 252 while the switch housing cover includes a second stop 271. Not only do these two stops prevent excessive clockwise rotation of the switch, but in addition, they prevent the switch from over rotating in the counterclockwise direction past the off position shown in FIG. 13 of the drawings.

FIG. 17 shows a switch control accessibly located on the front o the fan. More particularly, the fan housing includes a housing part 323 having openings 325 which receive the ends of the bolts as well as locator pins from the motor housing to secure and accurately locate the motor 30 with the fan housing. A plate 321 has stand off legs 327 which align with the openings 325 to position a screw port 331 of the plate over screw receptacle 329 of the fan housing. Screw 333 goes through the screw port into the housing receptacle to secure the plate with the housing. A lever 339 has a hollow stem 341 which grips onto the splined end shaft 343 of the switch rotor. Lever 339 is held in position by plate 321. The lever is movable to the different settings 335 on the plate to adjust fan speed.

Figure 18:
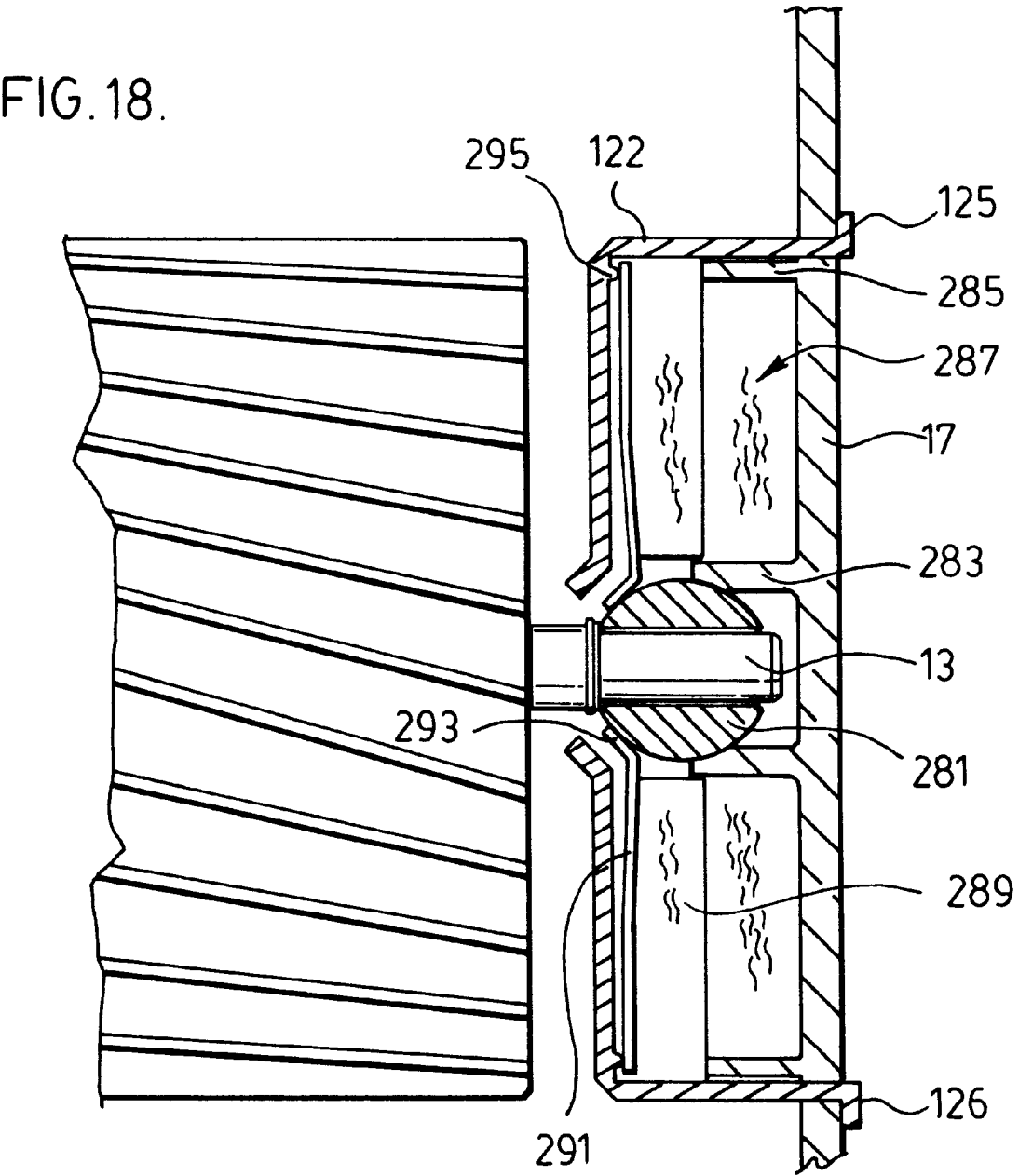
FIG. 18 is a sectional view through a bearing housing of the motor construction of FIG. 2.

A further feature of the present invention is shown in FIG. 18 of the drawings. This feature relates to the lubrication of the rotor shaft which happens at both the shaft end 13 within the motor housing and also along the shaft portion 11 as it passes out through the other side of the motor housing.

As earlier described, a bearing housing 122 is secured by its locking feet 123, 125, 126 and 127 on the end surface of motor housing portion 17. A similar bearing housing 275 fits on motor housing portion 15 and the internal contents of bearing housing 275 are the same as that shown in FIG. 18 of the drawings.

Both of the bearing housings, like the motor housing the switch housing and the switch body have a plastic construction and are made-in a single mold to substantially reduce the overall cost of the fan. Furthermore, as can be seen for example in FIG. 2, essentially all of the components have their own releasable interlock fingers to secure with the other components which significantly decreases the cost of the fan from both a material and a labour standpoint.

Returning to FIG. 18, an actual bearing member 281 slides onto the shaft end 13 from the rotor. The end wall of housing portion 17 includes a bearing seat 283 which allows for self location of bearing 281 in the seat. The end wall of the motor housing further includes a raised wall part 285 surrounding bearing seat 283 leaving a lubricant pocket 287 between seat 283 and wall 287. The motor housing wall directly behind pocket 287 has a solid construction to prevent the flow of fluids through the motor housing in this location.

The bearing housing 122 locks onto motor housing 17 over the raised wall 285. Trapped within bearing housing 122, over the lubricating chamber 287 is a double wicking member 289. This wicking member is held in position by a flexible spring 291 having an angled neck 293 lying directly against bearing 281.

The bearing housing 122 includes an inwardly projecting rib 295 which pushes on the outer edge of spring 291. This rib is not completely continuous around the bearing housing, but rather has small interruptions in the which allow lubricant to flow past the rib 295 within the bearing housing.

As a result of the above construction, the lubricant in chamber 287 is transferred to the bearing by wicking member 289. The contact between the spring neck 293 and the bearing allows very little, if any, of the lubricant to escape the bearing chamber in this region. Therefore, substantially all of the lubricant is recirculated to and from the chamber 287 onto the surface of the bearing by means of the wicking member 289.

In the event that any of the lubricant does get passed the contact surface between spring neck 293 and the bearing, this lubricant will have a tendency to drain between the bearing housing and the main body of spring 291 passed ribs 295 through the interruptions between the ribs back to the wicking member and the lubricant chamber.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as following:

1. An electrical appliance which operates at multiple speeds and which comprises a motor construction including a stator and a rotor which rotates within said stator, said stator comprising a plurality of magnetic flux inducing wires coiled on said stator, said stator and rotor being contained within a motor housing, said appliance further including a switch housing mounted directly to said motor housing, the flux inducing wires having wire ends which extend out of said motor housing and into said switch housing, said switch housing including receptors which receive the ends of the flux inducing wires and which also receive electrical contact members which secure and electrically connect with the ends of the flux inducing wires within the receptors of the switch housing.

2. An electrical appliance as claimed in claim 1, wherein the ends of said flux inducing wires comprise conductive wiring covered by insulation material and wherein said electrical contact members frictionally secure the ends of the flux inducing wires within the receptors while at the same time cutting through the insulation material to the conductive wiring of the ends of the wires.

3. An electrical appliance as claimed in claim 2, wherein a plurality of the wire ends of the flux inducing wires are secured within a single one of said receptors and wherein the electrical contact member received in such receptor electrically connects said plurality of wire ends.

4. An electrical appliance as claimed in claim 2, wherein the electrical contact members cut through the insulation at two separate locations on the ends of the flux inducing wires.

5. An electrical appliance as claimed in claim 1, wherein said electrical contact members include wire guides to provide accurate positioning of the ends of the flux inducing wires within the receptors.

6. An electrical appliance as claimed in claim 1, wherein said receptors and said electrical contact members include cooperating guides to guide accurate location of the electrical contact members within the receptors.

7. An electrical appliance as claimed in claim 1, wherein the ends of the flux inducing wires are of varying thicknesses, said receptors comprising traps with slot regions of varying width to accommodate the varying thicknesses of the wires ends.

8. An electrical appliance as claimed in claim 1, wherein said appliance includes an alternating current cord having first and second cord wires, said electrical contact members including spring loaded contact members which grip on and hold the first and second wires of the alternating current cord within said switch housing.

9. An electrical appliance as claimed in claim 1, wherein one of the ends of the flux inducing wires is fitted with a fuse which is trapped within said switch housing by, and electrically connected with, one of said electrical contact members.

10. An electrical appliance as claimed in claim 9, wherein said fuse comprises an electrically conductive center portion extending outward from a surrounding insulating sheath, said one of said electrical contact members including a cut out to fit said one of said electrical contact members over the insulating sheath while making contact with the electrically conductive center portion.

11. An electrical appliance as claimed in claim 10, wherein said one of said electrical contact members is trapped between a sidewall of said switch housing and fuse, said sidewall including a protrusion and said one of said electrical contact members including a spring part to urge said one of said electrical contact members against said electrically conductive center portion of said fuse.

12. An electrical appliance as claimed in claim 1, wherein said motor housing and said switch housing are both made from a plastic material, said switch housing including flexible arms which interlock with and releasably secure said switch housing against said motor housing.

13. An electrical appliance as claimed in claim 12, wherein said switch housing includes a switch housing cover which is releasably secured to said switch housing by flexible locking arms of said cover.

14. An electrical appliance as claimed in claim 13, including a rotary switch held in said switch housing by said switch housing cover, said rotary switch and said switch housing cover including cooperating stops which prevent over rotation of said rotary switch.

15. An electrical appliance as claimed in claim 12 and wherein, said motor housing and said switch housing are produced from a single mold.

16. An electrical appliance as claimed in claim 15, including a lubricated bearing region to receive one end of said rotor, said bearing region including a wicking material around a bearing member held by a spring which allows fluid lubricant within said bearing region to feed between said wicking material and said bearing member, said bearing region being contained by a plastic bearing housing which releasably interlocks with said motor housing, said bearing housing being produced from the single mold used to produce said motor housing and said switch housing.

17. An electrical appliance as claimed in claim 16, including a plastic switch body within said switch housing, said switch body also being produced from said single mold.

18. An electrical appliance as claimed in claim 1, rein said stator comprises a metallic body formed from metal layers laminated with one another and a plastic bobbin to receive the flux inducing wires, the plastic bobbin being injection molded onto said metallic body.

19. An electrical appliance as claimed in claim 18, wherein said bobbin includes spaced apart bobbin projections which engage the flux inducing wires between the winding regions of said bobbin to accommodate reverse winding of the flux inducing wires from one winding region to the next.

20. An electrical appliance as claimed in claim 18, including a heat sink comprising a metal band wrapping around said motor construction and having gripping portions pressed onto said metallic body of said stator.

* * * * *